United States Patent
Jiao et al.

(10) Patent No.: US 9,706,588 B2
(45) Date of Patent: Jul. 11, 2017

(54) METHOD, DEVICE AND SYSTEM FOR DEVICE TO DEVICE (D2D) RESOURCE ACQUISITION

(71) Applicant: China Academy of Telecommunications Technology, Beijing (CN)

(72) Inventors: Bin Jiao, Beijing (CN); Jiamin Liu, Beijing (CN); Fangli Xu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 244 days.

(21) Appl. No.: 14/415,443

(22) PCT Filed: Jul. 11, 2013

(86) PCT No.: PCT/CN2013/079204
§ 371 (c)(1),
(2) Date: Jan. 16, 2015

(87) PCT Pub. No.: WO2014/012457
PCT Pub. Date: Jan. 23, 2014

(65) Prior Publication Data
US 2015/0223279 A1    Aug. 6, 2015

(30) Foreign Application Priority Data
Jul. 18, 2012   (CN) .......................... 2012 1 0249661

(51) Int. Cl.
*H04W 76/02*   (2009.01)
*H04W 48/12*   (2009.01)
(Continued)

(52) U.S. Cl.
CPC ........... *H04W 76/023* (2013.01); *H04W 4/06* (2013.01); *H04W 48/12* (2013.01); *H04W 48/20* (2013.01);
(Continued)

(58) Field of Classification Search
CPC ... H04W 76/023; H04W 72/042; H04W 4/06; H04W 48/12; H04W 84/042; H04W 8/005
See application file for complete search history.

(56) References Cited

U.S. PATENT DOCUMENTS

2013/0064138 A1*   3/2013   Hakola ................... H04L 67/16
370/255
2013/0109301 A1*   5/2013   Hakola ............... H04W 76/023
455/39

FOREIGN PATENT DOCUMENTS

CN       101232737 A        7/2008
CN       101771586          7/2010
(Continued)

OTHER PUBLICATIONS

Casaccia, Lorenzo, "3GPP RAN Rel-12 & Beyond", Qualcomm; 3rd Generation Partnership Project (3GPP), Mobile Competence Centre; 650 Route Des Lucioles; F-06921 Sophia-Antipolis Cedex; France.

(Continued)

*Primary Examiner* — Thai Nguyen
(74) *Attorney, Agent, or Firm* — Foley & Lardner LLP; James F. Ewing; Paul M. H. Pua (57) ABSTRACT

Disclosed are a method, system and device for data transmission in the access point handover process, which is used to solve the problem existing in the prior art that interrupt delay of data plane will be increased when the access point handover is carried out in the case of heterogeneous network. The method of the embodiment of the present inven- (Continued)

tion comprises: a user equipment determines that in the case that Radio Resource Control (RRC) connection remains the same, all or part of the Data Radio Bearers (DRBs) reconfigured from one cell to another cell is needed; the user equipment, in the access point handover process, transmits data through the original DRB, and the original DRB is the last used DRB before the data plane access point handover. The user equipment, during the access point handover process, transmits data through the original DRB, thereby reducing the interrupt delay of the data plane when the access point handover is carried out in the case of heterogeneous network, and further improving the handover efficiency and shortening the data transmission time.

11 Claims, 7 Drawing Sheets

(51) Int. Cl.
*H04W 4/06* (2009.01)
*H04W 72/04* (2009.01)
*H04W 48/20* (2009.01)
*H04W 8/00* (2009.01)
*H04W 84/04* (2009.01)

(52) U.S. Cl.
CPC .......... *H04W 72/042* (2013.01); *H04W 8/005* (2013.01); *H04W 84/042* (2013.01)

(56) References Cited

FOREIGN PATENT DOCUMENTS

| | | |
|---|---|---|
| CN | 101772199 | 7/2010 |
| CN | 102149166 A | 8/2011 |
| CN | 102246575 | 11/2011 |
| CN | 102461297 | 5/2012 |
| WO | WO-2010/139847 A1 | 12/2010 |
| WO | WO-2011/088619 A1 | 7/2011 |
| WO | WO2011116815 A1 | 9/2011 |
| WO | WO-2012/088470 A1 | 6/2012 |

OTHER PUBLICATIONS

Supplementary European Search Report for EP 13820195 dated Jul. 10, 2015.
International Search Report for PCT/CN2013/079204 mailed Oct. 17, 2013.

\* cited by examiner

METHOD, DEVICE AND SYSTEM FOR DEVICE TO DEVICE (D2D) RESOURCE ACQUISITION

The present application is a US National Stage of International Application No. PCT/CN2013/079204, filed Jul. 11, 2013, designating the United States, and claiming the benefit of Chinese Patent Application No. 201210249661.9, filed with the Chinese Patent Office on Jul. 18, 2012 and entitled "Method, device and system for obtaining D2D resource", which is hereby incorporated by reference in its entirety.

FIELD

The present invention relates to the field of communications and particularly to a method, device and system for obtaining a Device to Device (D2D) communication resource.

BACKGROUND

Figure 1A:
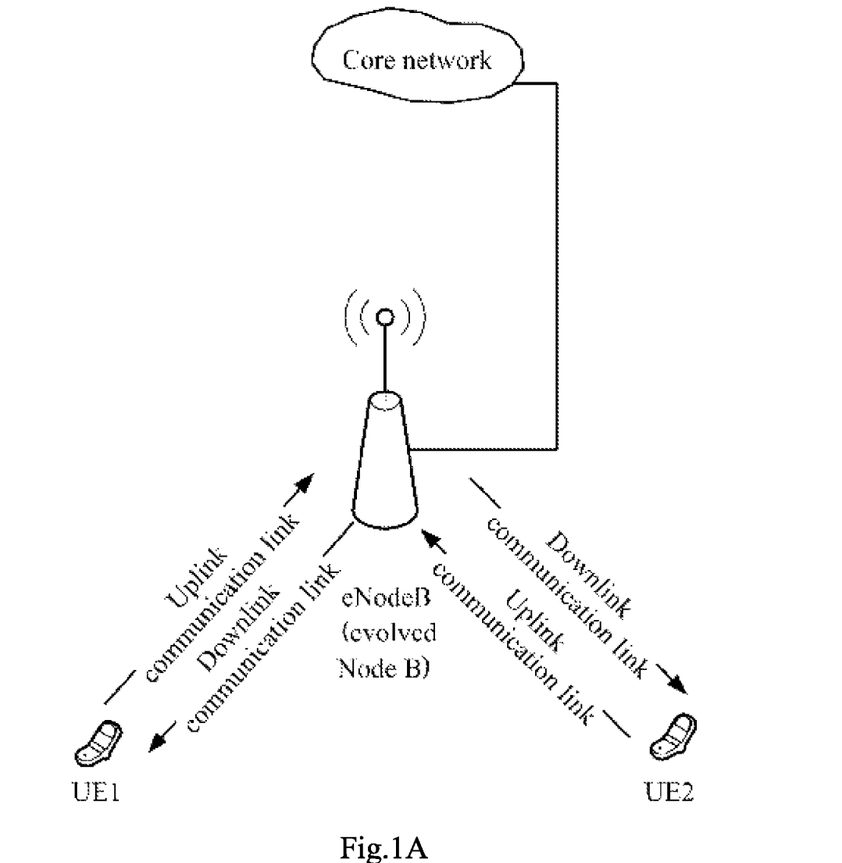
FIG. 1a is a schematic architectural diagram of the network system with centralized control in the prior art.

The network centralized control scheme is applied in a Long Term Evolution (LTE) system so that both uplink and downlink data of User Equipments (UEs) is transmitted and received under the control of a network, and there is no direct communication link present between one UE and another UE, but communication between them needs to be forwarded and controlled by the network, and no UE is allowed to transmit uplink data by itself, as illustrated in FIG. 1a.

In the prior art, pure Device to Device (D2D) communication refers to direct communication between one UE and another UE through Bluetooth, Wireless Fidelity (WiFi) and other technologies, and such communication is performed by the UEs per se over unlicensed band resources without being managed and controlled by a network operator and lends itself to very limited application scenarios.

If the D2D communication technology is introduced to a mobile communication operator network, then another D2D communication mode can be applied in which some direct communication are allowed between UEs so that one of the UEs can obtain information directly from the other UE in the D2D communication manner, and these direct communication links can be established under the control or assistance by the network, and D2D communication between the UEs is based upon discovery of a proximate UE.

Figure 1B:
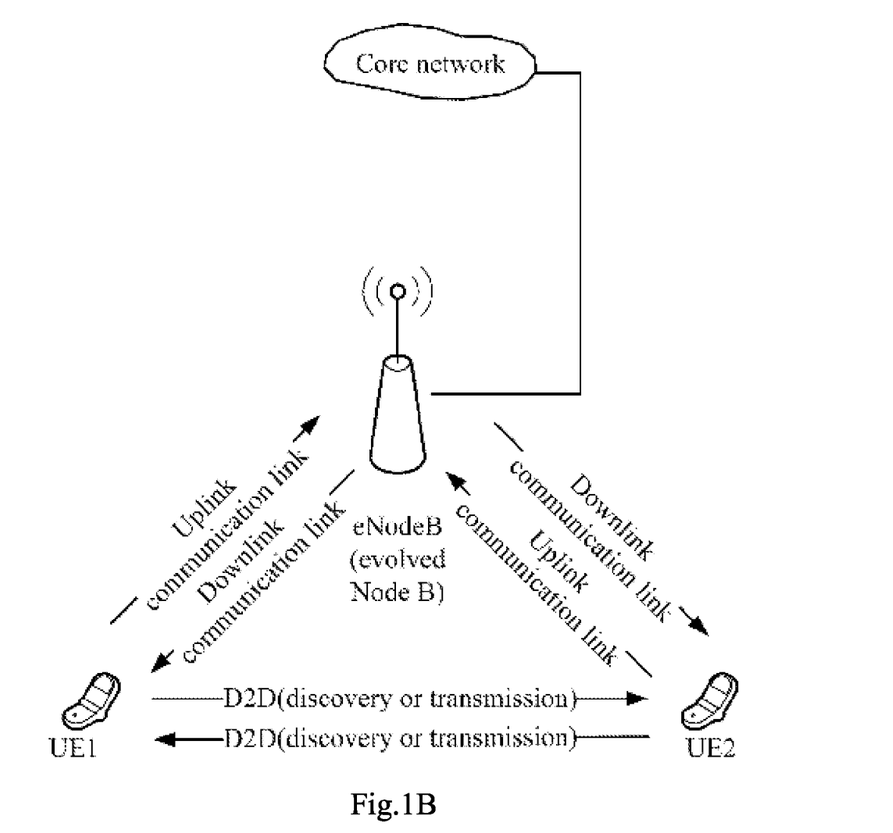
FIG. 1b is a schematic architectural diagram of the network system in which the UEs are configured for D2D communication 1 in the prior art.

As illustrated in FIG. 1b, an evolved Node B (simply eNB) establishes uplink/downlink communication links respectively with a UE1 and a UE2 under the control by a Core Network (CN) to configure the UE1 and the UE2 with resources so that both the UEs configured with the resources can perform D2D communication based upon resource configuration information.

As can be apparent, no direct communication between the UEs in the D2D communication manner can be supported in the cellular system in the prior art, and there is such a requisite condition, under which the cellular system can be enabled to support the D2D communication mode between the UEs, that both the D2D communication parties must obtain the D2D communication resource configuration information in advance.

SUMMARY

Embodiments of the invention provide a method, device and system for obtaining a D2D communication resource so as to perform D2D communication between UEs by notifying of D2D communication resource configuration information in a system broadcast.

Particular technical solutions according to the embodiments of the invention are as follows:

There is a method for obtaining a D2D communication resource, the method including:

receiving, by a UE, a system broadcast message; and obtaining and storing, by the UE, D2D communication resource configuration information carried in the system broadcast message, wherein the D2D communication resource configuration information including channel configuration information and a list of identifiers of Public Land Mobile Networks (PLMNs) sharing the D2D communication resource configuration information.

There is a User Equipment (UE) including:

a receiving component configured to receive a predefined system broadcast message; and an obtaining component configured to obtain and store D2D communication resource configuration information carried in the system broadcast message, wherein the D2D communication resource configuration information including channel configuration information and a list of identifiers of Public Land Mobile Networks (PLMNs) sharing the D2D communication resource configuration information.

There is a system for obtaining a D2D communication resource, the system including:

a network-side device configured to transmit to User Equipments (UEs) a predefined system broadcast message carrying D2D communication resource configuration information including channel configuration information and a list of identifiers of Public Land Mobile Networks (PLMNs) sharing the D2D communication resource configuration information; and The UEs configured to receive the system broadcast message and to obtain and store the D2D communication resource configuration information carried in the system broadcast message.

There is a UE including:

a transceiver configured to receive a system broadcast message;

a processor configured to obtain and store D2D communication resource configuration information carried in the system broadcast message received by the transceiver, wherein the D2D communication resource configuration information including channel configuration information and a list of identifiers of Public Land Mobile Networks (PLMNs) sharing the D2D communication resource configuration information; and a memory configured to store the D2D communication resource configuration information obtained by the processor.

With the technical solutions above, in the embodiments of the invention, the system broadcast message is predefined to carry the D2D communication resource configuration information, and the UEs obtain and store the D2D communication resource configuration information carried in the system broadcast message upon reception of the system broadcast message so that the UEs perform D2D communication according to the stored D2D communication resource information, where the UEs are notified of the D2D communication resource configuration information in the system broadcast.

DETAILED DESCRIPTION

In order to notify UEs of D2D communication resource configuration information in a system broadcast so as to perform D2D communication between the UEs, embodiments of the invention provide a method, device and system for obtaining a D2D communication resource.

Preferred embodiments of the invention will be described below with reference to the drawings.

Figure 2:
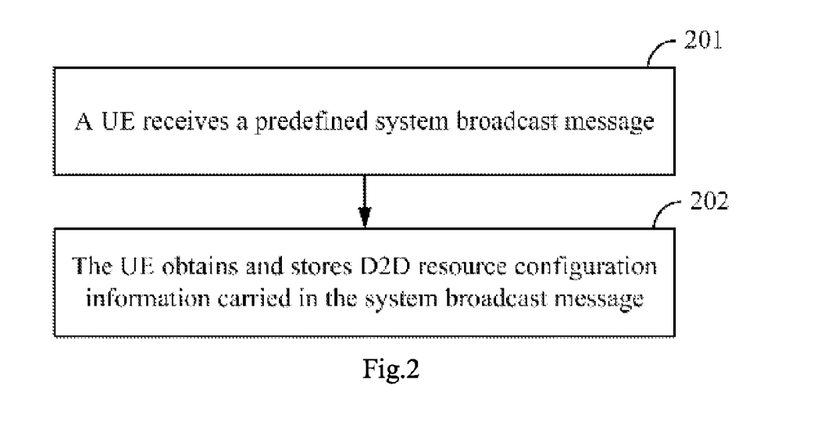
FIG. 2 is a flow chart of a method for obtaining a D2D communication resource according to an embodiment of the invention.

As illustrated in FIG. 2, a particular flow of a method for obtaining a D2D communication resource according to an embodiment of the invention is as follows:

In the operation 201, a UE receives a predefined system broadcast message.

In the operation 202, the UE obtains and stores D2D communication resource configuration information, carried in the system broadcast message, including channel configuration information and a list of identifiers of Public Land Mobile Networks (PLMNs) sharing the D2D communication resource configuration information (e.g., a series of information including time and/or frequency resource indicators, modulation and coding schemes, maximum transmission power, antenna ports in use, etc., for D2D communication).

In the embodiment of the invention, the predefined system broadcast message can be a predefined system broadcast message for notifying of D2D communication public resource configuration information or a predefined system broadcast message for notifying of D2D communication private resource configuration information.

The D2D public resource configuration information is applicable to a transmission process and a reception process of D2D communication, that is, the D2D communication public resource configuration information can be used for a transmitting UE in D2D communication or a receiving UE in D2D communication; and the D2D communication private resource configuration information is applicable only to the reception process of D2D communication, that is, the D2D communication private resource configuration information is applicable only to the receiving UE.

When the system broadcast message is a predefined first system broadcast message, the UE obtains D2D communication public resource configuration information, carried in the first system broadcast message, including D2D communication public channel configuration information and a list of identifiers of PLMNs sharing the D2D communication public resource configuration information.

In this embodiment, the D2D communication public channel configuration information includes but will not be limited to one or any combination of the following information: timeslot and frequency layer configuration information, transmit power information and modulation and coding scheme information.

The transmit power information is configured to limit maximum transmit power of the UE in D2D communication; the modulation and coding scheme information is configured to control a modulation and coding scheme in which the UE transmits or demodulates a D2D discovery message; and the timeslot and frequency layer configuration information is configured to indicate physical layer timeslot and frequency resources for D2D public channels.

Particularly the UE initially accessing a network reads the first system broadcast message and obtains and stores the D2D communication public resource configuration information.

When the system broadcast message is a predefined second system broadcast message, the UE obtains D2D communication private resource configuration information, carried in the second system broadcast message, including D2D communication private channel configuration information and a list of identifiers of PLMNs sharing the D2D private resource configuration information.

In this embodiment, the D2D communication private channel configuration information includes but will not be limited to one or any combination of the following information: timeslot and frequency layer configuration information and modulation and coding scheme information.

The modulation and coding scheme information is configured to notify of a modulation and coding scheme in which the UE demodulates a D2D discovery message; and the timeslot and frequency layer configuration information is configured to indicate physical layer timeslot and frequency resources for D2D communication private channels.

Particularly the UE initially accessing a network reads the second system broadcast message and obtains the D2D communication private resource configuration information.

In this embodiment, the first system broadcast message is defined as a new System Information Block (SIB), and the second system broadcast message is defined as a new System Information Block (SIB2).

Preferably the UE judges whether an identifier of a PLMN with which the UE is currently registered belongs to the list of identifiers of PLMNs carried in the D2D communication resource configuration information after obtaining the D2D communication resource configuration information carried in the system broadcast message and determines that the UE satisfies a precondition of a successful access to a cellular network and the D2D communication resource configuration information is valid upon determining that the identifier of the PLMN with which the UE is currently registered belongs to the list of identifiers of PLMNs.

When the UE performs a D2D communication function, mobility of the UE and a change in geographical location of the UE may result in a change in serving cell of the UE in the cellular network, a preset D2D communication area where the UE is located and a PLMN serving the UE, so the following three particular embodiments will be applicable in which persistent validity of a D2D communication resource is determined while the UE is moving in the cellular network.

A validity range of the D2D communication resource configuration information can be valid per PLMN or can be valid per cell, and a process in which the UE determines validity of the D2D communication resource configuration information will be described below in two particular embodiments.

Figure 3:
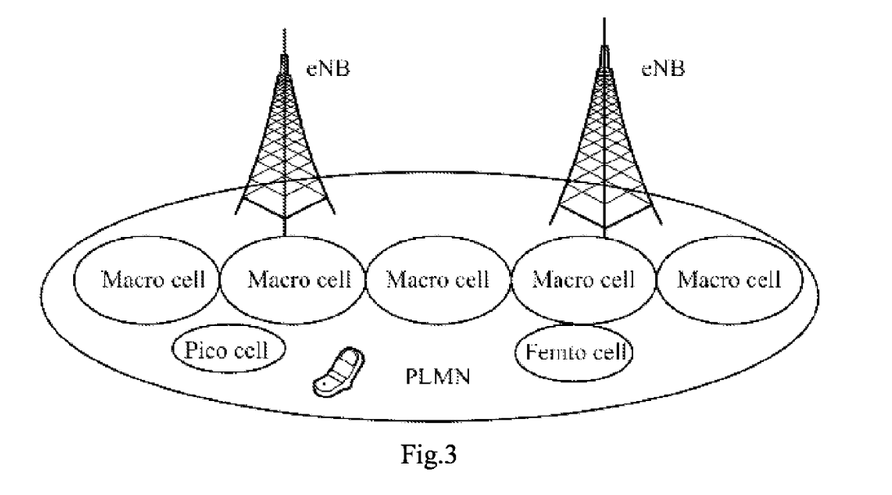
FIG. 3 is a schematic diagram of a validation range per PLMN according to an embodiment of the invention.
Figure 4:
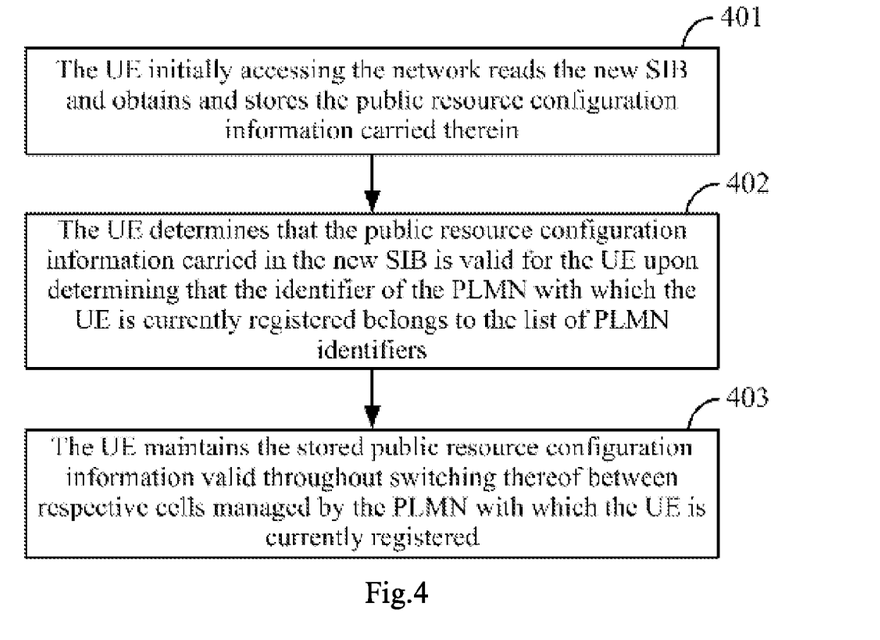
FIG. 4 is a flow chart of determining validity of D2D communication public resource configuration information according to an embodiment of the invention.

In a first particular embodiment, as illustrated in FIG. 3, in the case that the D2D communication resource configuration information is validated per PLMN, a particular process in which the UE determines validity of the D2D communication public resource configuration information is as illustrated in FIG. 4:

In the operation 401, the UE initially accessing the network reads the new SIB and obtains and stores the public resource configuration information carried therein, i.e., the D2D communication public channel configuration information and the list of identifiers of PLMNs sharing the D2D communication public resource configuration information.

In the operation 402, the UE judges whether the identifier of the PLMN with which the UE is currently registered belongs to the list of identifiers of PLMNs and determines that the UE satisfies the precondition of a successful access to the cellular network and the public resource configuration information carried in the new SIB is valid for the UE upon determining that the identifier belongs to the list of identifiers of PLMNs.

In the operation 403, the UE maintains the stored public resource configuration information valid throughout switching thereof between respective cells managed by the PLMN with which the UE is currently registered.

The particular embodiment has been described taking the public resource configuration information as an example, and in the case that the private resource configuration information is validated per PLMN, a particular process in which the UE determines validity of the D2D communication private resource configuration information is similar thereto, so a repeated description thereof will be omitted here.

Figure 5:
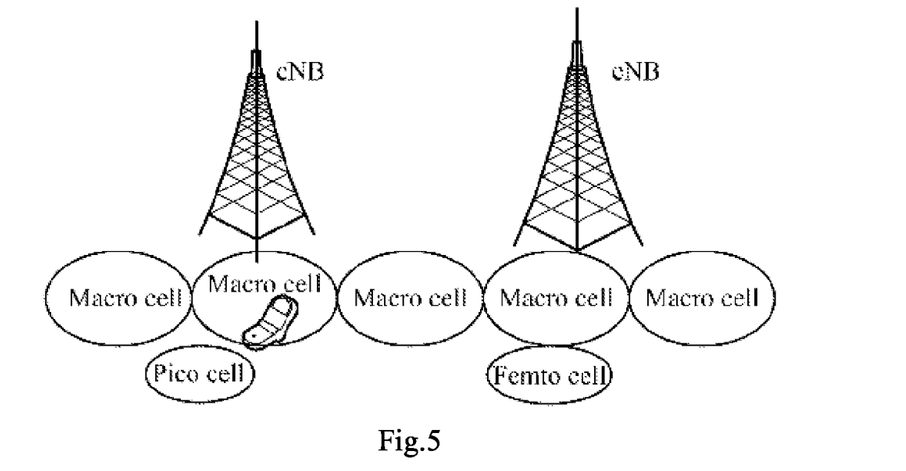
FIG. 5 is a schematic diagram of a validation range per cell according to an embodiment of the invention.
Figure 6:
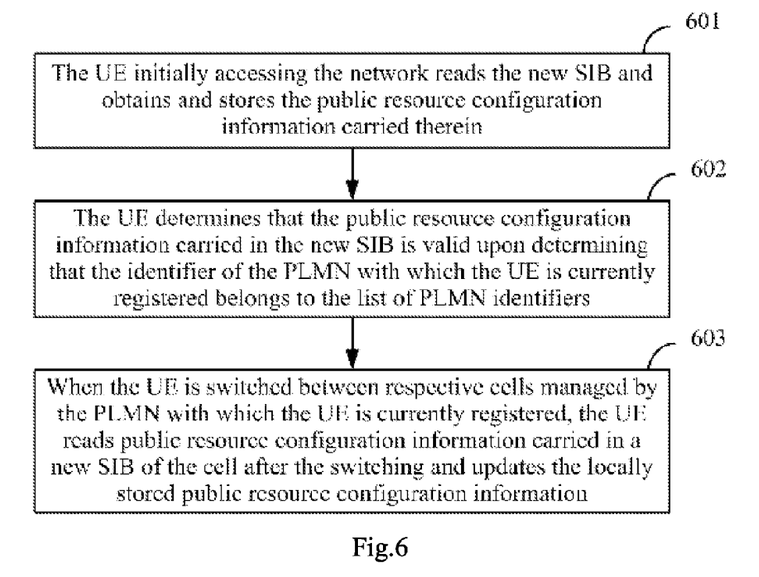
FIG. 6 is another flow chart of determining validity of D2D communication public resource configuration information according to an embodiment of the invention.

In a second particular embodiment, as illustrated in FIG. 5, in the case that the D2D communication resource configuration information is validated per cell, a particular process in which the UE determines validity of the D2D communication public resource configuration information is as illustrated in FIG. 6:

In the operation 601, the UE initially accessing the network reads the new SIB and obtains and stores the public resource configuration information carried therein, i.e., the D2D communication public channel configuration information and the list of identifiers of PLMNs sharing the D2D communication public resource configuration information.

In the operation 602, the UE judges whether the identifier of the PLMN with which the UE is currently registered belongs to the list of identifiers of PLMNs and determines that the UE satisfies the precondition of a successful access to the cellular network and the public resource configuration information carried in the new SIB is valid for the UE upon determining that the identifier belongs to the list of identifiers of PLMNs.

In the operation 603, when the UE is switched between respective cells managed by the PLMN with which the UE is currently registered, after the UE is switched to a new cell, the UE reads public resource configuration information carried in a new SIB of the cell after the switching and updates the locally stored public resource configuration information.

The particular embodiment has been described taking the public resource configuration information as an example, and in the case that the private resource configuration information is validated per cell, a particular process in which the UE determines validity of the D2D communication private resource configuration information is similar thereto, so a repeated description thereof will be omitted here.

The embodiment of the invention further proposes the concept of a D2D communication area, where each D2D communication area corresponds to a D2D communication area identifier (ID), and D2D communication resource configuration information is valid in a specific D2D communication area.

The D2D communication area includes at least one cell, and when it includes a plurality of cells, the cells can be different types of cells, e.g., a macro cell, a pico cell, a femto cell, etc., and the cells can be served by the same or different PLMNs. In a practical application, any number of cells can be configured in the D2D communication area by an operator as needed in reality.

Separate D2D communication areas can be set for the D2D communication public resource configuration information and private resource configuration information.

In this embodiment, a D2D communication area where the UE is currently located can be notified of as follows:

In a first implementation, a D2D communication area identifier is carried in the new SIB to indicate a D2D communication area, where the UE is currently located, covering at least one cell.

Particularly the UE obtains the public resource configuration information carried in the new SIB by reading the new SIB and obtaining and storing the D2D communication area identifier.

In a second implementation, a D2D communication area identifier is carried in the new SIB2 to indicate a D2D communication area, where the UE is currently located, covering at least one cell.

Particularly the UE obtaining the D2D communication resource configuration information carried in the new SIB2, obtains the D2D communication area identifier by reading the new SIB2 and stores the D2D communication area identifier.

In a third implementation, a D2D communication area where the UE is currently located is notified of in an existing System Information Block Type 1 (SIB1).

Particularly the UE receives the SIB1 and obtains and stores the D2D communication area identifier, carried in the SIB1, to indicate the D2D communication area where the UE is currently located, covering at least one cell.

In this implementation, the UE can judge from the D2D communication area ID whether the UE has moved to a new D2D communication area upon reception of the complete SIB1 message after moving to a new cell, and if the UE has not moved to a new D2D communication area, then the D2D communication configuration information previously stored by the UE is still valid, and there is no need to read the new SIB of the cell after the movement.

Hereupon a third particular embodiment of the invention further provides a particular process in which the UE determines validity of the D2D communication resource configuration information when the D2D communication resource configuration information is validated per D2D communication area.

Figure 7:
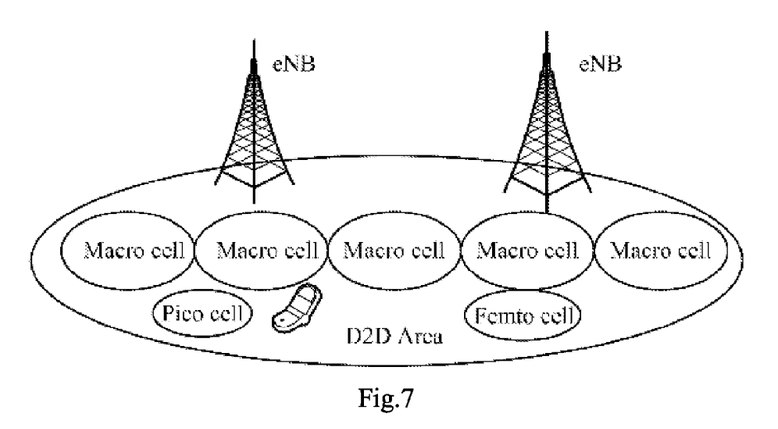
FIG. 7 is a schematic diagram of a validation range per D2D communication area according to an embodiment of the invention.
Figure 8:
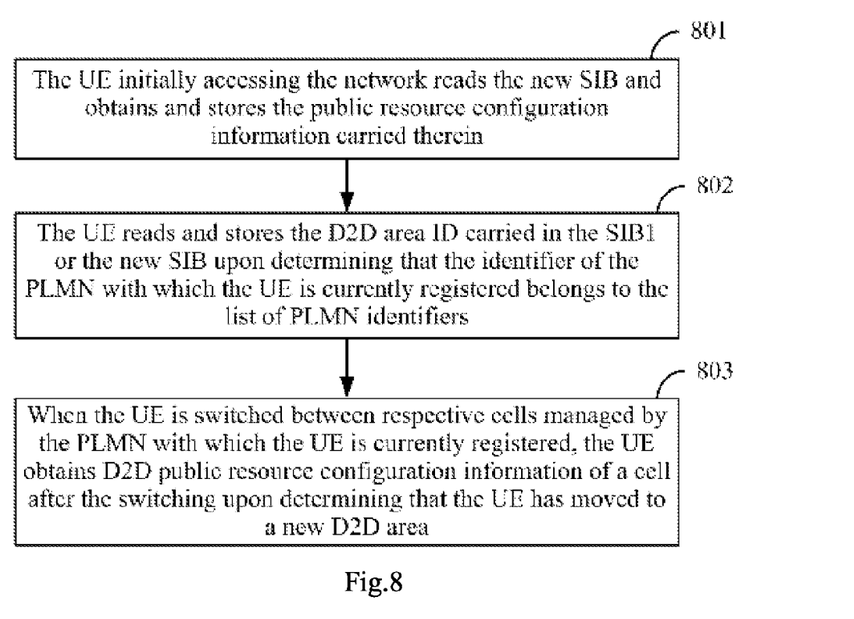
FIG. 8 is another flow chart of determining validity of D2D communication public resource configuration information according to an embodiment of the invention.

In the third particular embodiment, as illustrated in FIG. 7, in the case that the D2D communication resource configuration information is validated per D2D communication area, a particular process in which the UE determines validity of the D2D communication public resource configuration information is as illustrated in FIG. 8:

In the operation 801, the UE initially accessing the network reads the new SIB and obtains and stores the public resource configuration information carried therein, i.e., the D2D communication public channel configuration information and the list of identifiers of PLMNs sharing the D2D communication public resource configuration information.

In the operation 802, the UE judges whether the identifier of the PLMN with which the UE is currently registered belongs to the retrieved list of identifiers of PLMNs and determines that the D2D communication public resource configuration information carried in the new SIB is valid for the UE and reads and stores the D2D communication area ID carried in the SIB 1 or the new SIB upon determining that the identifier belongs to the list of identifiers of PLMNs.

In the operation 803, when the UE is switched between respective cells managed by the PLMN with which the UE is currently registered, each time the UE is switched to a new cell, the UE reads an SIB 1 or a new SIB of the cell after the switching, obtains a D2D communication area ID configured for the cell, judges whether the D2D communication area ID configured for the cell after the switching is the same as the previously stored D2D communication area ID, and if so, then the UE has not moved to a new D2D communication area; otherwise, it is determined that the UE has moved to a new D2D communication area, and the UE obtains D2D communication public resource configuration information carried in the new SIB of the cell after the switching, updates the locally stored D2D communication public resource configuration information with the D2D communication public resource configuration information and updates the locally D2D communication area ID with the D2D communication area ID configured for the cell after the switching.

The particular embodiment has been described taking the D2D communication public resource configuration information as an example, and in the case that the D2D communication private resource configuration information is validated per D2D communication area, the D2D communication area where the UE is currently located can be obtained from the SIB1 or the new SIB2, and a particular process in which the UE determines validity of the D2D communication private resource configuration information is similar thereto, so a repeated description thereof will be omitted here.

When separate D2D communication areas are set for the D2D communication public resource configuration information and the D2D communication private resource configuration information, the UE reads the D2D communication area ID of the public resource configuration information from the new SIB and the D2D communication area ID of the private resource configuration information from the new SIB2; and when the same D2D communication area is for the D2D communication public resource configuration information and private resource configuration information, the UE reads the D2D communication area ID of the public resource configuration information from the new SIB, the SIB1 or the new SIB2 and the D2D communication area ID of the private resource configuration information from the new SIB, the SIB1 or the new SIB2.

In a practical application, the UE is preconfigured with the D2D communication public resource configuration information and the D2D communication private resource configuration information validated per PLMN, cell or D2D communication area, and accordingly the UE is switched between cells per PLMN, cell or D2D communication area as preconfigured.

Figure 9:
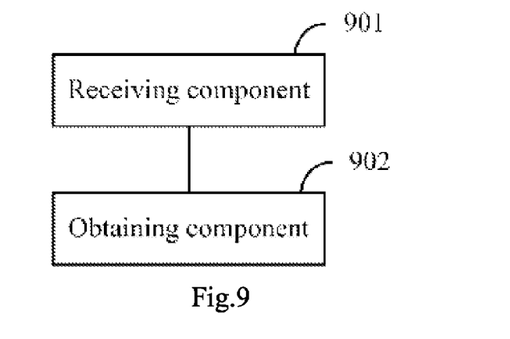
FIG. 9 is a schematic structural diagram of a user equipment according to an embodiment of the invention.

Based upon the same inventive idea, an embodiment of the invention further provides a User Equipment (UE), and reference can be made to the implementation of the UE in the method above for a particular implementation of the UE, so a repeated description thereof will be omitted here; and as illustrated in FIG. 9, the user equipment generally includes the following components:

A receiving component 901 is configured to receive a predefined system broadcast message; and An obtaining component 902 is configured to obtain and store D2D communication resource configuration information, carried in the system broadcast message, including channel configuration information and a list of identifiers of Public Land Mobile Networks (PLMNs) sharing the D2D communication resource configuration information.

The obtaining component is configured, when the predefined system broadcast message is a first system broadcast message, to obtain D2D communication public resource configuration information, carried in the first system broadcast message, including D2D communication public channel configuration information and a list of identifiers of PLMNs sharing the D2D communication public resource configuration information.

The obtaining component is configured to read the first system broadcast message and to obtain the D2D communication public resource configuration information when the UE initially accesses a network.

The obtaining component is configured, when the predefined system broadcast message is a second system broadcast message, to obtain D2D communication private resource configuration information, carried in the second system broadcast message, including D2D communication private channel configuration information and a list of identifiers of PLMNs sharing the D2D communication private resource configuration information.

The obtaining component is configured to read the second system broadcast message and to obtain the D2D communication private resource configuration information when the UE initially accesses a network.

The obtaining component is further configured, after the D2D communication resource configuration information carried in the predefined system broadcast message is obtained, to determine that the D2D communication resource configuration information is valid upon determining that an identifier of a PLMN with which the UE is currently registered belongs to the list of identifiers of PLMNs sharing the D2D communication resource configuration information.

The obtaining component is further configured, if the D2D communication resource configuration information is validated per PLMN, to maintain the stored D2D communication resource configuration information valid when the UE is switched between respective cells managed by the PLMN with which the UE is currently registered.

The obtaining component is further configured, if the D2D communication resource configuration information is validated per cell, when the UE is switched between respective cells managed by the PLMN with which the UE is currently registered, to read D2D communication resource configuration information carried in a system broadcast message of a cell after the switching and to update the locally stored D2D communication resource configuration information.

The obtaining component is further configured, when the first system broadcast message includes a D2D communication area identifier, to read the first system broadcast message and to obtain and store the D2D communication area identifier to indicate a D2D communication area, where the UE is currently located, covering at least one cell.

The obtaining component is further configured, when the second system broadcast message includes a D2D communication area identifier, to read the second system broadcast message and to obtain and store the D2D communication area identifier to indicate a D2D communication area, where the UE is currently located, covering at least one cell.

The obtaining component is further configured:

To receive an SIB1 and to obtain and store a D2D communication area identifier, carried in the SIB1, to indicate a D2D communication area, where the UE is currently located, covering at least one cell.

The obtaining component is further configured:

When the D2D communication resource configuration information is validated per D2D communication area, to obtain the D2D communication resource configuration information carried in the system broadcast message and then determine that an identifier of a PLMN with which the UE is currently registered belongs to the list of identifiers of PLMNs sharing the D2D communication resource configuration information; and When the UE is switched between respective cells managed by the PLMN with which the UE is currently registered, to obtain a D2D communication area identifier of a cell after the switching, and upon determining that the D2D communication area identifier of the cell after the switching is not the same as the locally stored D2D communication area identifier, to obtain D2D communication resource configuration information carried in a system broadcast message of the cell after the switching and to update the locally stored D2D communication resource configuration information and D2D communication area identifier.

Figure 10:
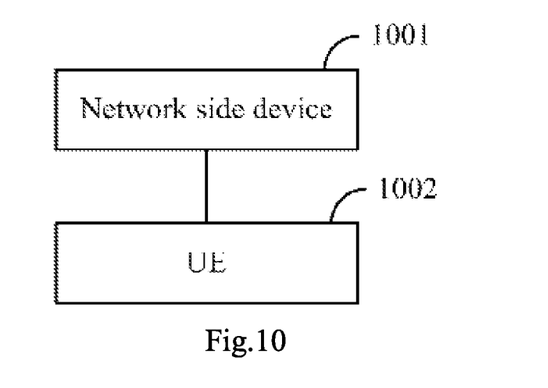
FIG. 10 is a schematic architectural diagram of a system for obtaining a D2D communication resource according to an embodiment of the invention.

Based upon the same inventive idea, an embodiment of the invention further provides a system for obtaining a D2D communication resource, and reference can be made to the description of the method above for a particular implementation of the system, so a repeated description thereof will be omitted here; and as illustrated in FIG. 10, the system generally includes:

A network-side device 1001 is configured to transmit to UEs a predefined system broadcast message carrying D2D communication resource configuration information including channel configuration information and a list of identifiers of Public Land Mobile Networks (PLMNs) sharing the D2D communication resource configuration information; and The UEs 1002 are configured to receive the system broadcast message and to obtain and store the D2D communication resource configuration information carried in the system broadcast message.

Figure 11:
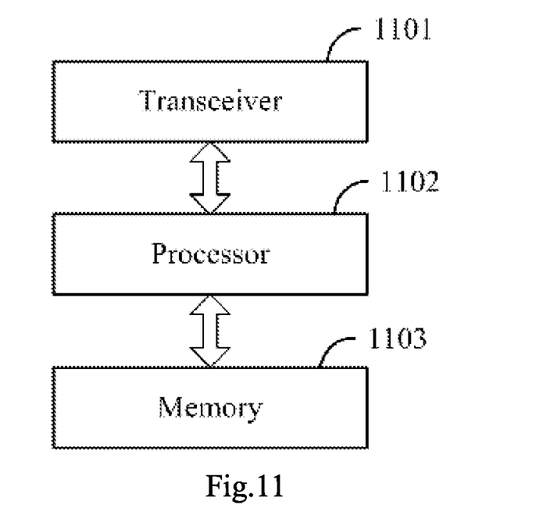
FIG. 11 is a schematic structural diagram of a user equipment according to another embodiment of the invention.

Based upon the same inventive idea, an embodiment of the invention further provides a User Equipment (UE), and reference can be made to the implementation of the UE in the method above for a particular implementation of the UE, so a repeated description thereof will be omitted here; and as illustrated in FIG. 11, the user equipment generally includes the following modules: a transceiver 1101, a processor 1102 and a memory 1103, functions of which will be as described below:

The transceiver 1101 is configured to receive a system broadcast message;

The processor 1102 is configured to obtain and store D2D communication resource configuration information, carried in the system broadcast message received by the transceiver 1101, including channel configuration information and a list of identifiers of Public Land Mobile Networks (PLMNs) sharing the D2D communication resource configuration information; and The memory 1103 is configured to store the D2D communication resource configuration information obtained by the processor 1102.

The system broadcast message received by the transceiver 1101 is a first system broadcast message; and correspondingly the processor 1102 obtains D2D communication public resource configuration information, carried in the first system broadcast message received by the transceiver 1101, including D2D communication public channel configuration information and a list of identifiers of PLMNs sharing the D2D communication public resource configuration information, and the processor 1102 can obtain the D2D communication public resource configuration information by reading the first system broadcast message received by the transceiver 1101 when the UE initially accesses a network.

The system broadcast message received by the transceiver 1101 is a second system broadcast message; and correspondingly the processor 1102 can obtain D2D communication private resource configuration information, carried in the second system broadcast message received by the transceiver 1101, including D2D communication private channel configuration information and a list of identifiers of PLMNs sharing the D2D communication private resource configuration information, and the processor 1102 can obtain the D2D communication private resource configuration information by reading the second system broadcast message received by the transceiver 1101 when the UE initially accesses a network.

After the D2D communication resource configuration information carried in the system broadcast message received by the transceiver 1101 when the UE initially accesses the network is obtained, if it is determined that an identifier of a PLMN with which the UE is currently registered belongs to the list of identifiers of PLMNs in the D2D communication resource configuration information, then the processor 1102 can determine that the D2D communication resource configuration information is valid and store the D2D communication resource configuration information determined to be valid.

Furthermore the processor 1102 is further configured: if the D2D communication resource configuration information is validated per PLMN, to maintain the locally stored D2D communication resource configuration information valid when the UE is switched between respective cells managed by the PLMN with which the UE is currently registered; or if the D2D communication resource configuration information is validated per cell, when the UE is switched between respective cells managed by the PLMN with which the UE is currently registered, to read D2D communication resource configuration information carried in a system broadcast message of a cell after the switching and to update the locally stored D2D communication resource configuration information.

In the respective UEs, the system broadcast message received by the transceiver 1101 further includes a D2D communication area identifier to notify of a D2D communication area, where the UE is currently located, covering at least one cell; and correspondingly the processor 1102 can read the system broadcast message and obtain and store the D2D communication area identifier when the D2D communication resource configuration information carried in the system broadcast message is obtained. When the D2D communication resource configuration information is validated per D2D communication area, after the D2D communication resource configuration information carried in the system broadcast message received by the transceiver 1101 when the UE initially accesses the network is obtained, if it is determined that an identifier of a PLMN with which the UE is currently registered belongs to the list of identifiers, of PLMNs in the currently received D2D communication resource configuration information, then the processor 1102 can determine that the currently received D2D communication resource configuration information is valid and store the D2D communication resource configuration information determined to be valid; and when the UE is switched between respective cells managed by the PLMN with which the UE is currently registered, the processor 1102 can obtain a D2D communication area identifier carried in a system broadcast message of a cell after the switching, and if it is determined that the D2D communication area identifier carried in the system broadcast message of the cell after the switching is not the same as the locally stored D2D communication area identifier, then the processor 1102 can obtain D2D communication resource configuration information carried in the system broadcast message of the cell after the switching and update the locally stored D2D communication resource configuration information and D2D communication area identifier.

With the technical solutions above, in the embodiments of the invention, the system broadcast message is predefined to carry the D2D communication resource configuration information, and the UEs obtain and store the D2D communication resource configuration information carried in the system broadcast message upon reception of the system broadcast message so that the UEs perform D2D communication according to the stored D2D resource information, where the UEs are notified of the D2D communication resource configuration information in the system broadcast.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for obtaining a Device to Device (D2D) communication resource, the method comprising:

receiving, by a User Equipment (UE), a system broadcast message; and obtaining and storing, by the UE, D2D communication resource configuration information carried in the system broadcast message, the D2D communication resource configuration information comprising channel configuration information and a list of identifiers of Public Land Mobile Networks (PLMNs) sharing the D2D communication resource configuration information, so that the UE communicates with another UE based on the stored D2D communication resource configuration information, wherein in a case that the D2D communication resource configuration information is D2D communication public resource configuration information, obtaining by the UE the D2D communication resource configuration information carried in the system broadcast message comprises:

obtaining, by the UE, D2D communication public resource configuration information, carried in the system broadcast message, comprising D2D communication public channel configuration information and the list of identifiers of PLMNs sharing the D2D communication public resource configuration information, by reading the system broadcast message when the UE initially accesses a network which is one of the PLMNs;

wherein a pre-condition for storing by the UE the D2D communication public resource configuration information carried in the system broadcast message is that;

after the D2D communication public resource configuration information, carried in the system broadcast message received by the UE during initially accessing the network which is one of the PLMNs, is obtained, it is determined that an identifier of a PLMN with which the UE is currently registered belongs to the list of identifiers of PLMNs in the D2D communication public resource configuration information.

2. The method of claim 1, wherein in a case that D2D communication resource configuration information is D2D communication private resource configuration information, obtaining by the UE the D2D communication resource configuration information carried in the system broadcast message comprises:

obtaining, by the UE, D2D communication private resource configuration information carried in the system broadcast message, wherein the D2D private resource configuration information comprising D2D communication private channel configuration information and the list of identifiers of PLMNs sharing the D2D communication private resource configuration information.

3. The method of claim 2, wherein obtaining by the UE the D2D communication resource configuration information carried in the system broadcast message comprises:

obtaining, by the UE, the D2D communication private resource configuration information by reading the system broadcast message when the UE initially accesses a network which is one of the PLMNs.

4. The method of claim 3, wherein obtaining and storing by the UE the D2D communication resource configuration information carried in the system broadcast message comprises:

after the D2D communication resource configuration information, carried in the system broadcast message received by the UE during initially accessing the network, which is one of the PLMNs, is obtained, if it is determined that an identifier of a PLMN with which the UE is currently registered belongs to the list of identifiers of PLMNs in the D2D communication resource configuration information, then determining by the UE that the D2D communication resource configuration information is valid and storing the D2D communication resource configuration information determined to be valid.

5. The method of any one of claim 1, wherein:

if the D2D communication resource configuration information is validated per PLMN identifier, then maintaining by the UE the stored D2D communication resource configuration information valid when the UE is switched between respective cells managed by a PLMN with which the UE is currently registered;

or if the D2D communication resource configuration information is validated per cell, when the UE is switched between respective cells managed by a PLMN with which the UE is currently registered, reading, by the UE, D2D communication resource configuration information carried in a system broadcast message of a cell after the switching and updating the locally stored D2D communication resource configuration information;

or wherein the system broadcast message further comprises a D2D communication area identifier to notify of a D2D communication area, where the UE is currently located, covering at least one cell; and obtaining and storing, by the UE, the D2D communication resource configuration information carried in the system broadcast message comprises:

obtaining, by the UE, the D2D communication area identifier by reading the system broadcast message, and storing, by the UE, the D2D communication area identifier;

wherein the D2D communication resource configuration information is validated per D2D communication area; and reading the system broadcast message and obtaining and storing the D2D communication resource configuration information carried in the system broadcast message, by the UE, comprises:

after the D2D communication resource configuration information, carried in the system broadcast message received by the UE initially accessing a network, is obtained, if it is determined that an identifier of a PLMN with which the UE is currently registered belongs to the list of identifiers of PLMNs in the currently received D2D communication resource configuration information, then determining by the UE that the currently received D2D resource configuration information is valid and storing the D2D communication resource configuration information determined to be valid; and the method further comprises:

when the UE is switched between respective cells managed by the PLMN with which the UE is currently registered, obtaining a D2D communication area identifier carried in a system broadcast message of a cell after the switching, and if it is determined that the D2D communication area identifier carried in the system broadcast message of the cell after the switching is not the same as the locally stored D2D communication area identifier, then obtaining D2D communication resource configuration information carried in the system broadcast message of the cell after the switching and updating the locally stored D2D communication resource configuration information and D2D communication area identifier.

6. A system for obtaining a Device to Device (D2D) communication resource, the system comprising a network-side device and User Equipments (UEs);

wherein the network-side device is configured to transmit to the UEs a predefined system broadcast message, carrying D2D communication resource configuration information comprising channel configuration information and a list of identifiers of Public Land Mobile Networks (PLMNs) sharing the D2D communication resource configuration information; and the UEs are configured to receive the system broadcast message and to obtain and store the D2D communication resource configuration information carried in the system broadcast message, so that a first UE of the UEs communicates with another UE of the UEs based on the stored D2D communication resource configuration information, wherein in a case that the D2D communication resource configuration information is D2D communication public resource configuration information, the network-side device is configured to transmit to the UEs the predefined system broadcast message, carrying D2D communication public channel configuration information and the list of identifiers of PLMNs sharing the D2D communication public resource configuration information, and the first UE is configured to obtain the D2D communication public resource configuration information by reading the system broadcast message when the first UE initially accesses a network which is one of the PLMNs;

wherein a pre-condition for storing by the first UE the D2D communication public resource configuration information carried in the system broadcast message is that:

after the D2D communication public resource configuration information, carried in the system broadcast message read by the first UE during initially accessing the network which is one of the PLMNs, is obtained, it is determined that an identifier of a PLMN with which the first UE is currently registered belongs to the list of identifiers of PLMNs in the D2D communication public resource configuration information.

7. A User Equipment (UE), comprising:

a transceiver configured to receive a system broadcast message;

a processor configured to obtain and store D2D communication resource configuration information carried in the system broadcast message received by the transceiver, the D2D resource configuration information comprising channel configuration information and a list of identifiers of Public Land Mobile Networks (PLMNs) sharing the D2D communication resource configuration information; and a memory configured to store the D2D communication resource configuration information obtained by the processor, so that the UE communicates with another UE based on the stored D2D communication resource configuration information, wherein in a case that the D2D communication resource configuration information is D2D communication public resource configuration information, the processor is configured to obtain the D2D communication public resource configuration information carried in the system broadcast message, comprising D2D communication public channel configuration information and the list of identifiers of PLMNs sharing the D2D communication public resource configuration information, by reading the system broadcast message when the UE initially accesses a network which is one of the PLMNs;

wherein a pre-condition for storing the D2D communication public resource configuration information carried in the system broadcast message is that:

after the D2D communication public resource configuration information, carried in the system broadcast message received by the transceiver when the UE initially accesses the network which is one of the PLMNs, is obtained, it is determined that an identifier of a PLMN with which the UE is currently registered belongs to the list of identifiers of PLMNs in the D2D communication public resource configuration information.

8. The UE of claim 7, wherein in a case that the D2D communication resource configuration information is D2D communication private resource configuration information, the processor is configured to obtain D2D communication private resource configuration information carried in the system broadcast message received by the transceiver, wherein the D2D private resource configuration information comprising D2D communication private channel configuration information and the list of identifiers of PLMNs sharing the D2D private resource configuration information.

9. The UE of claim 8, wherein the processor can obtain the D2D communication private resource configuration information by reading the system broadcast message received by the transceiver when the UE initially accesses a network which is one of the PLMNs.

10. The UE of claim 9, wherein the processor is configured, after the D2D communication resource configuration information, carried in the system broadcast message received by the transceiver when the UE initially accesses the network which is one of the PLMNs, is obtained, if it is determined that an identifier of a PLMN with which the UE is currently registered belongs to the list of identifiers of PLMNs in the D2D communication resource configuration information, to determine that the D2D communication resource configuration information is valid and to store the D2D communication resource configuration information determined to be valid.

11. The UE of any one of claim 7, wherein the processor is further configured:

if the D2D communication resource configuration information is validated per PLMN identifier, to maintain the stored D2D communication resource configuration information valid when the UE is switched between respective cells managed by a PLMN with which the UE is currently registered; or if the D2D communication resource configuration information is validated per cell, when the UE is switched between respective cells managed by a PLMN with which the UE is currently registered, to read D2D communication resource configuration information carried in a system broadcast message of a cell after the switching and to update the locally stored D2D communication resource configuration information; or the system broadcast message received by the transceiver further comprises a D2D communication area identifier to notify of a D2D communication area, where the UE is currently located, covering at least one cell; and the processor is further configured to obtain the D2D communication area identifier by reading the system broadcast message when the D2D communication resource configuration information carried in the system broadcast message is obtained, and store the D2D communication area identifier; wherein the D2D communication resource configuration information is validated per D2D communication area; and the processor is further configured, after the D2D communication resource configuration information, carried in the system broadcast message received by the transceiver when the UE initially accesses a network, is obtained, if it is determined that an identifier of a PLMN with which the UE is currently registered belongs to the list of identifiers of PLMNs in the currently received D2D communication resource configuration information, to determine that the currently received D2D communication resource configuration information is valid and to store the D2D communication resource configuration information determined to be valid; and when the UE is switched between respective cells managed by the PLMN with which the UE is currently registered, to obtain a D2D communication area identifier carried in a system broadcast message of a cell after the switching, and if it is determined that the D2D communication area identifier carried in the system broadcast message of the cell after the switching is not the same as the locally stored D2D communication area identifier, to obtain D2D communication resource configuration information carried in the system broadcast message of the cell after the switching and to update the locally stored D2D communication resource configuration information and D2D communication area identifier.

* * * * *